(12) United States Patent
Ailor et al.

(10) Patent No.: US 6,895,314 B2
(45) Date of Patent: May 17, 2005

(54) SPACECRAFT REENTRY BREAKUP RECORDER

(75) Inventors: William Henry Ailor, Palos Verdes Estates, CA (US); Ronald John Bywater, Foothill Ranch, VA (US); Leon Gurevich, Rancho Palos Verdes, CA (US)

(73) Assignee: The Aerospace Corporation, El Segundo, CA (US)

( * ) Notice: Subject to any disclaimer, the term of this patent is extended or adjusted under 35 U.S.C. 154(b) by 43 days.

(21) Appl. No.: 10/460,485

(22) Filed: Jun. 11, 2003

(65) Prior Publication Data

US 2004/0254697 A1 Dec. 16, 2004

(51) Int. Cl.[7] .............................................. G06F 19/00
(52) U.S. Cl. .......................... 701/13; 701/35; 244/160
(58) Field of Search ...................... 701/13, 35; 244/160

(56) References Cited

U.S. PATENT DOCUMENTS

| | | | | |
|---|---|---|---|---|
| 4,694,119 A | * | 9/1987 | Groenewegen | ............ 174/52.2 |
| 4,944,401 A | * | 7/1990 | Groenewegen | ............. 206/521 |
| 4,970,648 A | * | 11/1990 | Capots | ......................... 701/14 |
| 6,084,542 A | * | 7/2000 | Wright et al. | ........... 342/357.13 |
| 2002/0035416 A1 | * | 3/2002 | De Leon | ...................... 701/14 |

* cited by examiner

Primary Examiner—Thomas G. Black
Assistant Examiner—Eric M. Gibson
(74) Attorney, Agent, or Firm—Derrick Michael Reid

(57) ABSTRACT

One or more small self-contained reentry breakup recorders are disposed within a spacecraft and each includes a sensor suite for collecting and recording collected and recorded sensory data during reentry breakup of the spacecraft, and includes a communications system for broadcasting the collected and recorded sensory data after breakup and before impact with the surface of the earth to a remote communication system for preserving the sensory data of the breakup as well as data relating to critical events occurring prior to breakup. An internal GPS receiver provides sensory positional data of the reentry and breakup positions.

19 Claims, 3 Drawing Sheets

NOTATIONAL TIMELINE

REENTRY BREAKUP RECORDER SYSTEM

REENTRY BREAKUP RECORDER

SPACECRAFT REENTRY BREAKUP RECORDER

FIELD OF THE INVENTION

The invention relates to the field of spacecraft monitoring systems. More particularly, the present invention relates to monitoring equipment used on spacecraft during reentry for monitoring spacecraft breakup when heading towards the earth through the atmosphere.

BACKGROUND OF THE INVENTION

Aircraft and spacecraft are widely used for transportation of people or materials, but are subject to mechanical failures and pilot errors often leading to catastrophic crashes, collisions, and breakup. Aircraft and spacecraft have crashed on the surface of the earth. To correct mechanical designs or to understand why a mishap occurred, so as to prevent future mishaps, it is desirable to fully understand critical events leading up to the mishaps. Critical events leading up to a crash often reveal indication for the accident so that corrective steps can be taken. Hence, it is desirable to record for subsequent analysis, data revealing those critical events.

Aircraft have long used black boxes as in-flight recorders of operational and telemetry data for subsequent recovery, use, and analysis. The black boxes are typically recovered after a crash. The black boxes are designed to survive a crash and are made of strong durable materials with heat protection. One problem with black boxes is that they must be found after a crash, where the debris track from the crash may extend over several miles, or may be unrecoverable at the bottom of an ocean. To solve this problem, sound or broadcast beacons can be used to assist in locating the black boxes after a crash. However, such a beacon may not be effective where the black box ends up at the bottom of an ocean. Another problem with black boxes is that the black boxes may be damaged during the crash, requiring repairs of the black boxes so as to be able to adapt the box for subsequent off loading of recorded data. Yet another problem with black boxes is the repair of actual magnetic recordings recorded on magnetic media, in which the data can be corrupted by a damaged black box. Elaborate data recovery methods are used to recover the in-flight data. Yet another problem with black boxes is the inoperation of the black boxes after disintegration of the aircraft, during breakup of the aircraft, when the black box ceases recording data by severance to sensory inputs, thereby limiting the amount recoverable data to prebreakup sensory data. Black boxes are used on aircraft having communication systems, but black boxes do not broadcast sensory or telemetry data after breakup. Black boxes disadvantageously require after-crash location, repair of the black box data storage medium, black box data recovery, with data limited to prebreakup sensory inputs, so as to off load the limited in-flight data, so as to reconstruct the critical events for preventive analysis.

Spacecraft are also subject to collisions with space debris, pilot errors, mechanical failures, and natural orbital decays, leading to eventual crashes on the earth's surface. Here, however, the debris track may extend hundreds and possibly thousands of miles, such as in the Shuttle Columbia crash. Such extensive debris tracks render locating spacecraft black boxes impracticable especially where there is a high probability that the spacecraft will crash into an ocean, rendering the black boxes unrecoverable. During reentry, tremendous heat is generated on the surface of a downwardly tumbling breakup spacecraft, which effectively destroys all onboard systems. As such, spacecraft often use onboard in-flight sensors and communication systems for continuous transmission of sensory and telemetry data to a ground recording system. In-flight systems do not generally broadcast telemetry data in an omnidirectional mode, but rather communicate the data to a specific ground station for real time recording. One problem with this continuous transmission method is that the communications downlink fails when the onboard sensors and communication systems disintegrate during breakup. No in-situ data is received from which the breakup characteristics of a reentering spacecraft object may be derived.

With an ever-increasing number of space objects in orbit, with inherent orbital decays, there is an increasing probability that spacecraft may possibly cause damage to property or injury to people. It is desirable to fully understand when and where breakup occurs and how a spacecraft disintegrates during breakup and the possible trajectories of breakup debris. However, the continuous communication method disadvantageously ceases functioning during breakup and does not provide breakup time sensory and telemetry data. Both aircraft black boxes and spacecraft communications systems are directly tied into onboard remote sensors as active data collection systems, rendering these active data collection systems subject to destruction during craft breakup precluding the collection of data during breakup. These and other disadvantages are solved or reduced using the invention.

SUMMARY OF THE INVENTION

An object of the invention is to provide a system for broadcasting sensor data of a craft after breakup of a craft.

Another object of the invention is to provide a system for broadcasting sensor data of a craft after atmospheric breakup of a spacecraft.

Yet another object of the invention is to provide a system for recording of sensory data during breakup and for broadcasting sensory data after atmospheric breakup of a spacecraft.

Still another object of the invention is to provide a system for recording of sensory data during breakup and for broadcasting sensory data after atmospheric breakup of a spacecraft and prior to impact with the surface of the earth.

A further object of the invention is to provide a stand alone system attached to a spacecraft, which system is heat protected from atmospheric friction occurring during orbital decay toward earth, for recording sensory data during breakup and for broadcasting sensory data after atmospheric breakup of a spacecraft and prior to impact with the surface of the earth.

Yet a further object of the invention is to provide a stand alone system attached to a spacecraft, which system is heat protected from atmospheric friction occurring during orbital decay toward earth, for recording sensory data during breakup and for broadcasting sensory data after atmospheric breakup of a spacecraft and prior to impact with the surface of the earth, which system further uses internal battery power, communications, and sensors for providing passive data collection by collecting sensory data during breakup.

The invention is directed to a self-contained recorder system and transmitter designed to collect sensory information from both or either in-recorder sensors or ex-recorder sensors during the atmospheric reentry and breakup of a spacecraft, and designed to broadcast the sensory information to a remote communication system after breakup and prior to impacting the surface of the earth. The system enables the recovery of sensory data on spacecraft breakup, without a need to locate, repair, and recover data from the system after breakup. One of the sensors may be an internal GPS receiver for providing positional information on the exact location of the reentry. The system can be used as an onboard unrecoverable black box for use on space probes or in other flight systems where sensory information on critical events is required to be recorded. The system has internal battery power, communications, and sensors for providing passive data collection by collecting sensory data from enclosed sensors disposed in the system.

In the preferred form, the system includes a wakeup method for activating recovery during the initial phase of orbital decaying spacecraft. The system records data during the breakup period and maximum heating period and survives to continue operation, when later in the downward path, the system broadcasts the recorded data. The system is designed to survive the frictional atmospheric heat generated during the maximum heating period. As such, the system provides sensory breakup data of spacecraft during reentry. These and other advantages will become more apparent from the following detailed description of the preferred embodiment.

DETAILED DESCRIPTION OF THE PREFERRED EMBODIMENT

Figure 1:
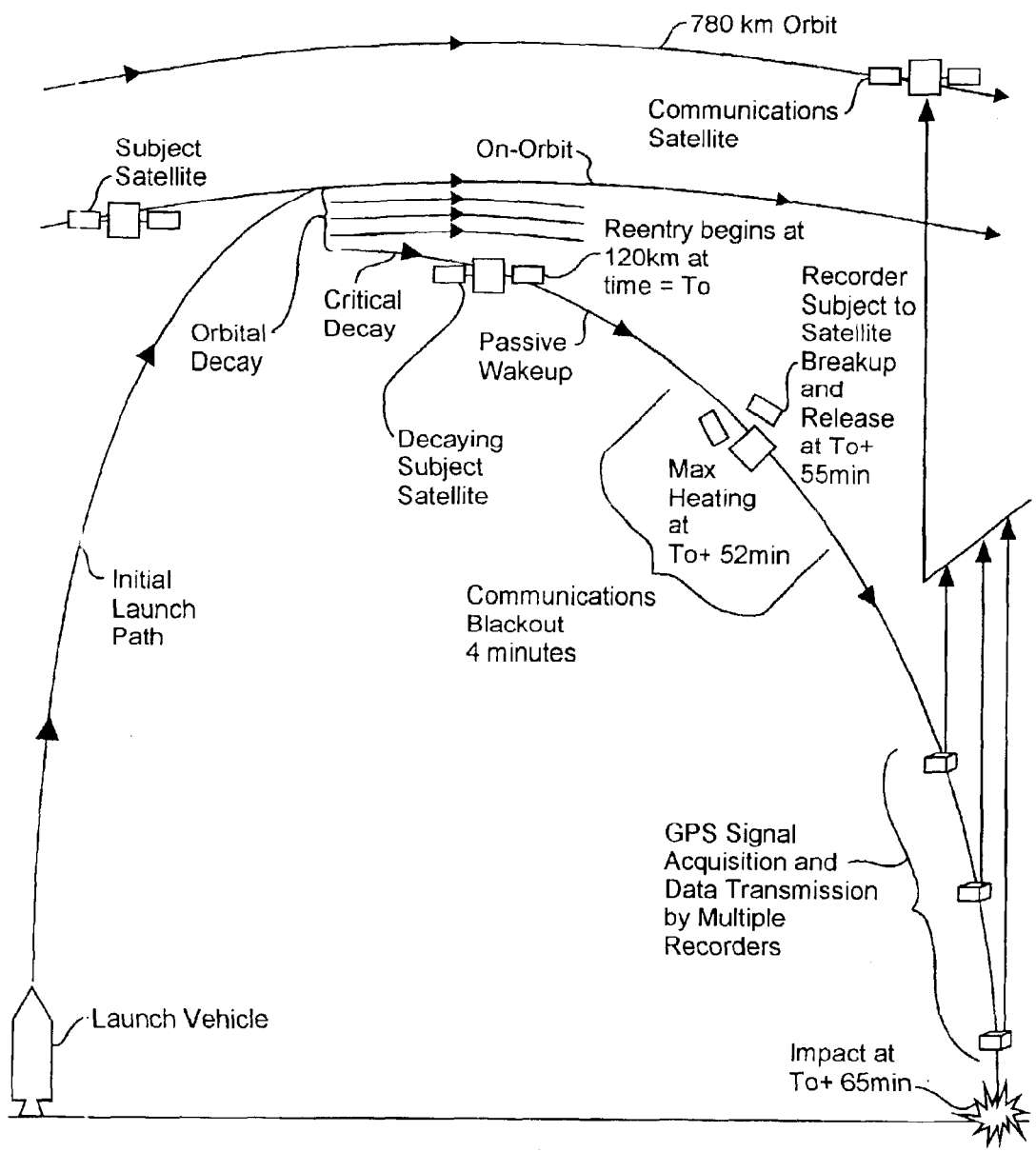
FIG. 1 is a diagram of notational timeline of orbital decaying spacecraft.

An embodiment of the invention is described with reference to the figures using reference designations as shown in the figures. Referring to FIG. 1, a launch vehicle is launched through an initial launch path to place a subject satellite on orbit. The subject satellite is equipped with one or more breakup recorders. One or more reentry breakup recorders are preferably attached to various support structures within the host subject satellite. The recorder preferably lies operationally dormant for months or years while the host subject spacecraft is in operational use. After some time of operational use, the on-orbit subject satellite experiences orbital decay where the orbit altitude continuously decreases. At a critical time, the on-orbit subject satellite enters into a critical orbital decay of the orbit as a decaying subject satellite. At a reentry time, designated at time zero $t_o$, the decaying subject satellite becomes a reentering subject satellite at a predetermined altitude, such as, for example, 120 Km, when the recorder experiences a passive wakeup to activate the recording sensory data.

As the reentering subject satellite is reentering the atmosphere, the reentering subject satellite begins to heat up due to frictional forces applied by the atmosphere. At communications blackout time, that may last, for example, four minutes, at time zero plus about 52 minutes, the reentering subject satellite reaches a maximum heat level, where the reentering subject satellite break up over a relatively short period of time. The recorder is preferably released from the reentering subject satellite at about time zero plus 55 minutes, towards the end of an expected breakup period during maximum heating. Before and during the breakup period, the recorder is recording collected sensory data in the recorder. After breakup, the recorder and broken components of the spacecraft continue decent towards the surface of the earth at terminal velocities at reduced heat levels.

The recorder may, for example, impact the earth at time zero plus 65 minutes. Between the communications blackout time, and an impact with the earth, the recorder broadcasts the collected and recorded sensory data to a remote communication system, such as, for example, a communication satellite, that may be an Iridium satellite, in low earth orbit, at 780 km, for example. The broadcasted information be can transceived to a ground station for permanent recording of the collected, recorded, broadcasted, transceived, and permanently recorded sensory data.

Figure 2:
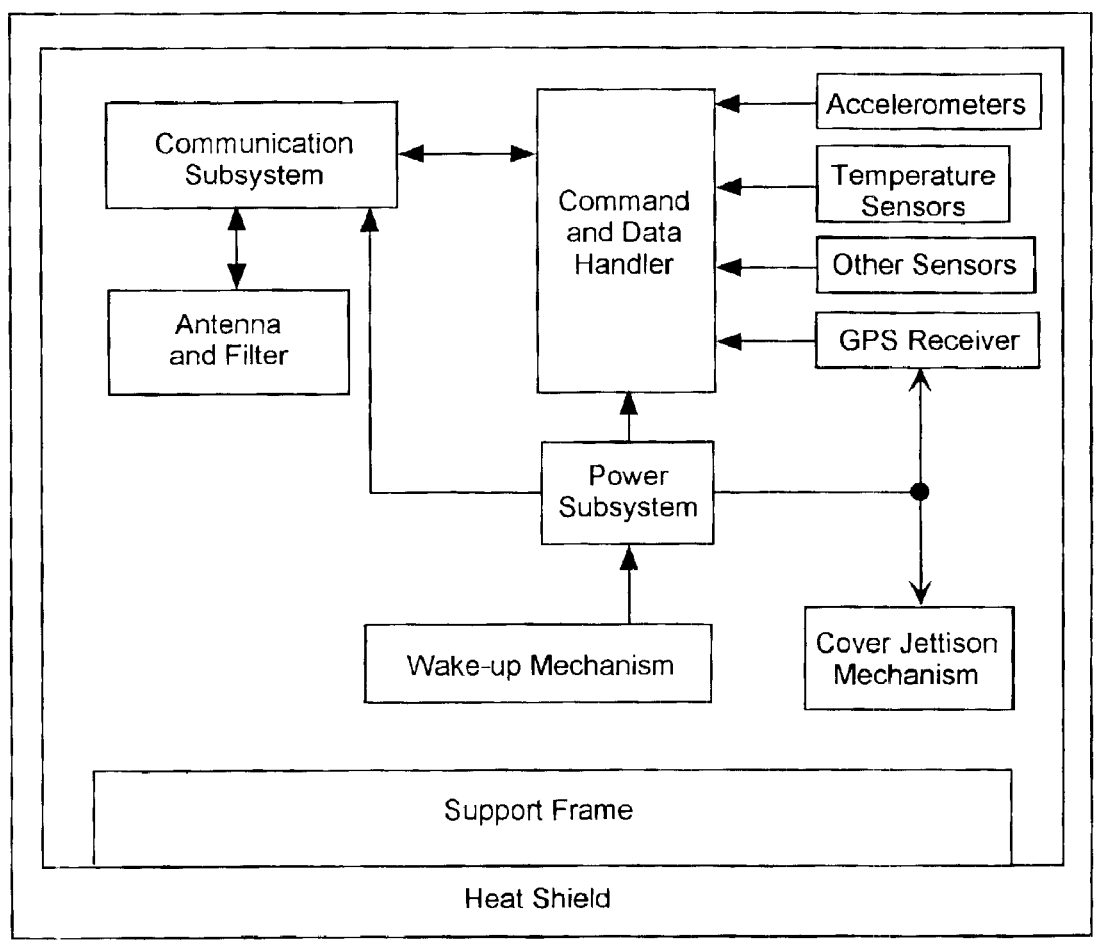
FIG. 2 is a block diagram of a reentry breakup recorder system.

Referring to FIGS. 1 and 2, and more particularly to FIG. 2, the recorder uses a heat shield to survive the maximum heating period during reentry. The recorder includes a support structure for supporting internal system components, including a wakeup mechanism, a power subsystem, a command data handler, a suite of sensors, and a communication subsystem with an attached antenna and filter. The handler is preferably a microcontroller with conventional onboard semiconductor memory. The sensor suite may include accelerometers, temperature sensors, a GPS receiver, and any other desirable sensors for the collection of sensory data. The recorder is a self-contained unit, including a power source. As such, the integrity of the heat shield is preserved as no wires are preferably extended through the shield. As such, the system internal components are segregated from the host subject satellite on-board systems, as a passive sensory reentry recorder. After maximum heating, when the recorder broadcasts sensory data, the antenna is preferably exposed by jettisoning an antenna cover using a cover jettison mechanism.

Figure 3:
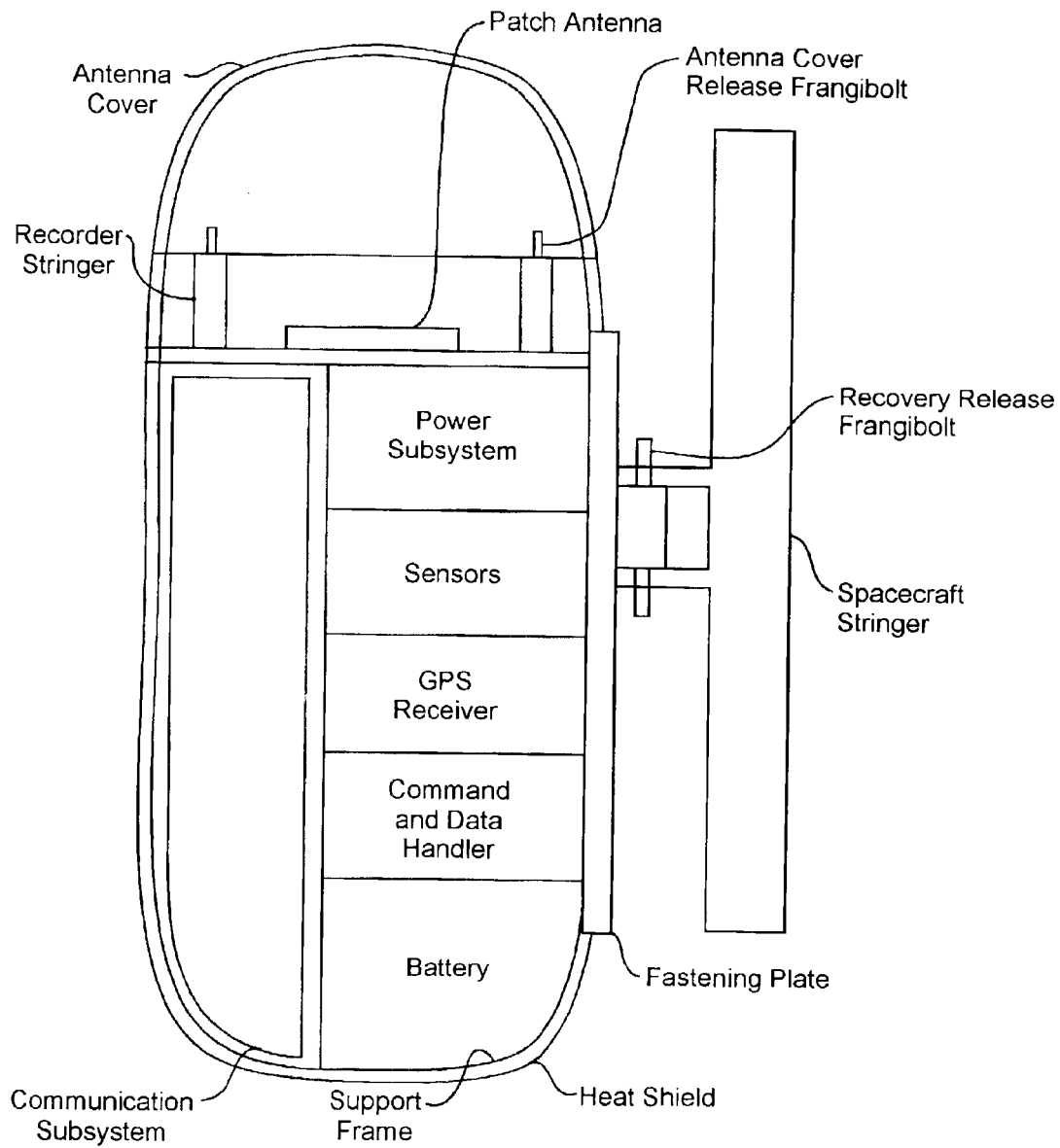
FIG. 3 is a diagram of a reentry breakup recorder.

Referring to all of the Figures, and more particularly to FIG. 3, one or more reentry breakup recorders would be attached to various support structures of the host subject satellite. The recorder should be small in size and weight when used particularly on spacecraft. For example, the recorder may be less than 2.0 kg with less than 312 cubic inches in volume. The recorder is attached to and released from the support structure, which may be for example, a spacecraft stringer. The recorder may be attached using an attaching and releasing mechanism, such as a recorder release frangibolt. The recorder could also be glued using a heat sensitive material configured to disintegrate and release at specific temperatures, for example, 500° C., during maximum heating phase. The preferred frangibolt enables controlled release at a predetermined temperature, or other condition. The recovery release frangibolt may interconnect the spacecraft stringer to a fastening plate attached to the recorder. The fastening plate may separate from recorder during maximum heating during reentry so that the entire recorder is completely encapsulated by the heat shield and support frame which function as a housing for the recorder. When the support frame and internal subsystems are designed to withstand the impact with the surface of the earth, the recorder can then be further used to locate the debris field for further investigations of the critical events leading to the breakup of the subject satellite.

The recorder can be adapted in various sizes and shapes. An external heat shield and internal support can be formed in an oval shape. An oval shape reduces tumbling of the recorder during reentry and defines a predetermined terminal velocity for accurate system design and timing. The communication subsystem, battery, command and data handler, sensors, and power subsystem are sized to efficiently fit within the oval support frame. The battery is appropriately sized, for example, to provide up to 5W of power for an hour during the entire reentry period. The recorder wakes-up at some point. The recorder could have internal timers to determine a wakeup time, or could use the on-board GPS receiver to determine a wakeup altitude, or could use the on-board temperature sensor to determine a wakeup temperature experienced during the early phases of the critical orbital decay. The temperature sensor can be located near the spacecraft support for measuring internal to the recorder, the external temperature. The wakeup method should use as little power as possible, so as to the preserve the operational lifetime of the recorder.

The internal sensor suite may include temperature sensors, accelerometers, pressure sensors, GPS sensors, and other devices designed to provide sensory data on the dynamics and breakup of the subject satellite. The sensory data can be, for example, flight trajectory data, temperature data, and pressure data. Sensor or other data may also be recorded from sensors and or systems external to the recorder. These sensors would not survive the reentry event, and their connection to the recorder would be severed during breakup. The data can be used to determine the characteristics, body dynamics, and breakup locations of reentering spacecraft. After reentry, the recorder would broadcast the data collected to a central station, either through a dedicated tracking and receiving antenna or any available communication services, such as a remote communications satellite. The freefall broadcast time is on the order of ten minutes. The freefall broadcast time is sufficient to broadcast large amounts of sensory data collected during break up. Use of commercially available services enables the sensory data to be recovered from events that occur anywhere on earth. After collecting and recording data during the breakup period, the recorder broadcasts the recorder data through the antenna and filter. The antenna is protected from the maximum heat level using a removable antenna cover that is jettisoned under handler or automatic control by an antenna cover release timer or other mechanism prior to broadcasting. The antenna cover release is preferably a plurality of antenna cover release frangibolts that are supported by a recorder stringer of the support frame. The antenna cover also includes a portion of the support frame and heat shield to protect the antenna during the maximum heating period. The antenna is preferably an omnidirectional patch antenna for broadcasting in all directions to the remote communication system.

The invention is directed to a reentry breakup recorder and system for preferred use on spacecraft, but could also be used on aircraft, automobiles, submarines, space probes, and other host systems subject to potential breakup under extreme conditions after a critical event. The recorder can be used to determine where debris from a subject host is located at the end of a mission. The recorder can also be used in research applications where recorded sensory data would improve breakup modeling and analysis. Those skilled in the art can make enhancements, improvements, and modifications to the invention, and these enhancements, improvements, and modifications may nonetheless fall within the spirit and scope of the following claims.

What is claimed is:

1. A recorder for recording sensory data during a breakup period during breakup of a host craft and for broadcasting sensory data after the breakup period after a critical event, the recorder comprising, a housing comprising a heat shield, comprising an antenna cover, and comprising a support frame, a craft release for attaching the recorder to the host craft during operational use of the host craft and for releasing the recorder from the host craft during the breakup period, a cover release for attaching the antenna cover to the recorder during the breakup period and for releasing the antenna cover after the breakup period, a sensor for sensing and collecting the sensory data, a memory for recording the collected sensory data as recorded sensory data, a communication subsystem for broadcasting the recorded sensory data, an antenna disposed under the antenna cover for transmitting the recorded sensory data during broadcasting after the breakup period, and a power subsystem for providing power to the communication subsystem.

2. The recorder of claim 1 wherein, the recorder is released during the breakup period.

3. The recorder of claim 1 wherein, the heat shield that encapsulates the recorder.

4. The recorder of claim 1 wherein, the support frame internally supports the sensor, communication subsystem, memory, antenna, and power subsystem.

5. The recorder of claim 1 wherein, the power subsystem comprises a battery.

6. The recorder of claim 1 wherein, the sensor is a GPS receiver for providing positional data, and the sensory data comprises the positional data.

7. The recorder of claim 1 wherein, the sensor is an accelerometer for providing acceleration data, and the sensory data comprises the acceleration data.

8. The recorder of claim 1 wherein, the sensor is a temperature sensor for providing temperature data, and the sensory data comprises the temperature data.

9. The recorder of claim 1 wherein, the sensor is a pressure sensor for providing pressure data, and the sensory data comprises the pressure data.

10. The recorder of claim 1 further comprising, a microcontroller for controlling collection, recording, and broadcasting of the sensory data.

11. The recorder of claim 1 wherein, the antenna is an omnidirectional patch antenna.

12. The recorder of claim 1 wherein, the craft is a spacecraft, and the breakup period extends during reentry of the spacecraft into atmosphere of earth.

13. The recorder of claim 1 wherein, the craft is a spacecraft, the breakup period extends during reentry of the spacecraft into atmosphere of earth, and the spacecraft experiences heating due to atmospheric friction during reentry.

14. The recorder of claim 1 wherein, the craft release comprises a frangibolt.

15. The recorder of claim 1 wherein, the recorder release comprises a frangibolt.

16. The recorder of claim 1 wherein, the recorder continues to collect, record, and broadcast sensory input data after impact with earth ground.

17. The recorder of claim 1 wherein, the craft release is a heat sensitive material disintegrating during heating during the breakup period.

18. The recorder of claim 1 wherein, the sensor comprises a wakeup temperature sensor, and the recorder starts recording the sensory data at a predetermined temperature sensed by the temperature sensor.

19. The recorder of claim 1 wherein, the sensor comprises a GPS receiver, and recorder starts recording the sensory data at a predetermined altitude sensed by the GPS receiver.

* * * * *